United States Patent [19]
Streets et al.

[11] Patent Number: 5,961,685
[45] Date of Patent: Oct. 5, 1999

[54] APPARATUS FOR APPLYING A GENERALLY UNIFORM SIZING COMPOSITION TO GLASS FIBERS

[75] Inventors: Arlo F. Streets, Lancaster; Thomas O. Matteson, Pickerington; Martin C. Flautt, Granville, all of Ohio

[73] Assignee: Owens Corning Fiberglass Technology, Inc., Summit, Ill.

[21] Appl. No.: 08/818,536

[22] Filed: Mar. 14, 1997

[51] Int. Cl.$^6$ .................................................. C03C 25/02
[52] U.S. Cl. ................... 65/529; 65/500; 65/535; 65/539; 65/443; 65/447; 65/448; 118/234; 118/244; 118/256; 118/258; 118/259; 118/DIG. 20; 492/17; 492/30; 492/31; 492/35; 492/43
[58] Field of Search ................... 65/443, 447, 448, 65/449, 450, 451, 499, 500, 529, 533, 535, 539; 118/234, 244, 256, 258, 259, DIG. 20; 492/16, 17, 30, 31, 35, 43

[56] References Cited

U.S. PATENT DOCUMENTS

| | | |
|---|---|---|
| 2,272,588 | 2/1942 | Simison . |
| 2,392,805 | 1/1946 | Biefeld ............................ 118/DIG. 20 |
| 2,691,852 | 10/1954 | Slayter et al. ............................ 65/529 |
| 2,719,350 | 10/1955 | Slayter et al. ............................ 65/535 |
| 2,719,352 | 10/1955 | Slayter et al. ............................ 65/535 |
| 2,723,215 | 11/1955 | Biefeld et al. ............................ 65/448 |
| 2,728,972 | 1/1956 | Drummond et al. ...................... 65/529 |
| 2,729,028 | 1/1956 | Slayter et al. ............................ 65/529 |
| 2,799,598 | 7/1957 | Biefeld et al. ............................ 65/448 |
| 2,861,393 | 11/1958 | Whitehurst et al. . |
| 2,968,278 | 1/1961 | Wolfe . |
| 3,116,192 | 12/1963 | Eilerman ................................ 65/448 |
| 3,323,941 | 6/1967 | Van Dijk .................................. 65/450 |
| 3,484,223 | 12/1969 | Vanderbilt et al. ....................... 65/448 |
| 3,498,262 | 3/1970 | Hill et al. . |
| 3,865,565 | 2/1975 | Spence et al. . |
| 4,013,435 | 3/1977 | Kane et al. . |
| 4,015,559 | 4/1977 | Sears et al. . |
| 4,042,360 | 8/1977 | Kane et al. . |
| 4,088,468 | 5/1978 | Roberson . |
| 4,109,610 | 8/1978 | Parbhoo et al. ........................... 65/447 |
| 4,115,088 | 9/1978 | Walker . |
| 4,168,959 | 9/1979 | Loeffler . |
| 4,192,252 | 3/1980 | Paul . |
| 4,222,344 | 9/1980 | Parbhoo .................................. 118/608 |
| 4,537,610 | 8/1985 | Armstrong et al. . |
| 4,579,078 | 4/1986 | French et al. . |
| 5,011,523 | 4/1991 | Roncato et al. . |
| 5,055,119 | 10/1991 | Flautt et al. . |
| 5,217,374 | 6/1993 | Birks ...................................... 432/236 |
| 5,222,434 | 6/1993 | Smith et al. ............................. 101/348 |
| 5,316,561 | 5/1994 | Roncato et al. . |
| 5,443,611 | 8/1995 | Salvador et al. . |

FOREIGN PATENT DOCUMENTS 824392  11/1959  United Kingdom .................. 118/244

OTHER PUBLICATIONS

Tselikov et al., "Rolling Mills", pp. 141–153, 1966.

*Primary Examiner*—Peter Chin
*Assistant Examiner*—Michael P. Colaianni
*Attorney, Agent, or Firm*—Inger H. Eckert

[57] ABSTRACT

A sizing applicator is provided for applying a coating of sizing composition to glass fibers. The sizing applicator includes a housing and a roll applicator which is rotatably coupled to the housing. The housing has a supply port adapted to receive sizing composition from a sizing supply source, an exit slot and a passageway extending from the supply port to the exit slot. The passageway receives sizing composition from the supply port and delivers the sizing composition to the exit slot such that the sizing composition exits the housing and is received on an outer surface of the roll applicator. The roll applicator is spaced from the housing such that the housing does not substantially contact the sizing composition once it is received on the roll applicator.

18 Claims, 6 Drawing Sheets

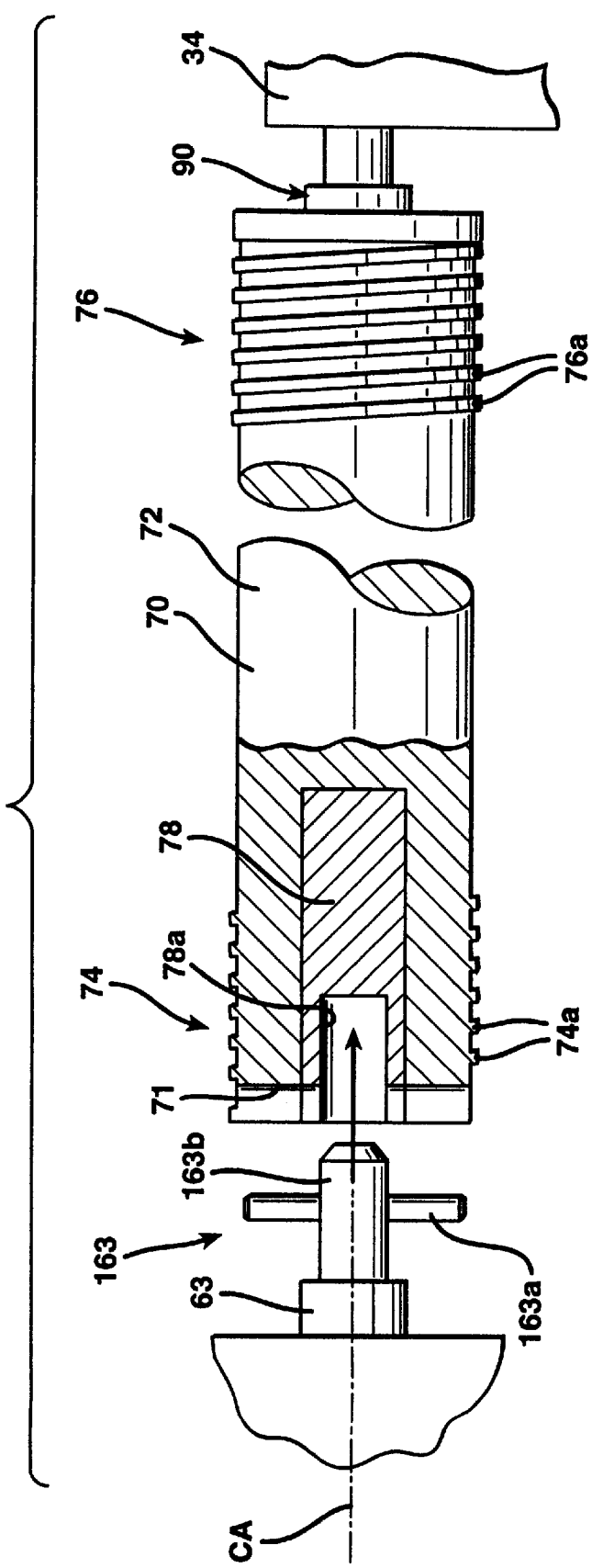

APPARATUS FOR APPLYING A GENERALLY UNIFORM SIZING COMPOSITION TO GLASS FIBERS

TECHNICAL FIELD AND INDUSTRIAL APPLICABILITY OF THE INVENTION

The present invention relates to a method and apparatus for applying a sizing composition to glass fibers. The method and apparatus of the present invention are applicable for use in a fiber forming operation.

BACKGROUND OF THE INVENTION

Glass fiber packages are commonly manufactured by supplying molten glass to a bushing, drawing glass fibers from the bushing, and applying a size, aqueous or nonaqueous, to the fibers via an applicator roll. The sized fibers may be gathered into a strand at a gathering shoe and wound on a collet to produce a glass fiber package.

U.S. Pat. No. 4,222,344 discloses an applicator for applying a sizing composition to glass fibers. The applicator includes a driven roll which receives sizing from a passageway and applies the sizing to the surface of glass fibers which are drawn across it. Positioned just above the roll is an upper housing portion which acts as a metering blade for the sizing composition so as to keep the thickness of the sizing composition substantially uniform along the length of the roll. However, if the surface of the roll is not completely uniform or if the roll rotates in a nonconcentric manner, the layer of sizing composition along the roll surface will be nonuniform. This will also occur if the lower surface of the upper housing portion, which defines the clearance between the upper housing portion and the roll, is nonuniform. A nonuniform layer of sizing composition on the applicator roll results in a nonuniform amount of sizing composition applied to the fibers drawn across the roll.

Accordingly, there is a need for an improved sizing applicator which is capable of applying a substantially uniform amount of sizing composition to glass fibers drawn across it.

SUMMARY OF THE INVENTION

This need is met by the present invention whereby an improved apparatus is provided for applying a generally uniform coating of a sizing composition to glass fibers.

In accordance with a first aspect of the present invention, an apparatus is provided for producing sized glass fibers. The apparatus comprises: a heated bushing for supplying streams of molten glass to be drawn into continuous fibers; a device adapted to draw the streams into the fibers; and a sizing applicator. The sizing applicator includes a housing and a roll applicator which is rotatably coupled to the housing. The housing has a supply port adapted to receive sizing composition under pressure from a sizing supply source, an exit slot and a passageway extending from the supply port to the exit slot. The passageway receives sizing composition from the supply port and delivers the sizing composition to the exit slot such that the sizing composition exits the housing and is received on an outer surface of the roll applicator. The roll applicator is spaced from the housing such that the housing does not substantially contact and alter sizing composition thickness of the sizing composition received on the roll applicator.

The device may comprise a conventional winder, chopper or like apparatus for drawings streams of molten glass into fibers.

The roll applicator preferably rotates about a central axis which lies in a generally horizontal plane. The exit slot may be positioned above the horizontal plane such that the sizing composition exits the housing and is received on the outer surface of the roll applicator above the horizontal plane.

The roll applicator further includes first and second end portions. In one embodiment, the first end portion has first spirals or threads and the second end portion has second spirals or threads. The first and second spirals are of opposite hands so as to divert sizing composition which contacts the first and second end portions inwardly as the roll applicator rotates.

Preferably, the passageway has a cross-sectional area which is generally constant from the supply port to the exit slot.

The apparatus further includes drive apparatus for effecting rotation of the roll applicator. The drive apparatus comprises a motor assembly and a clutch assembly. The motor assembly includes a motor having an output shaft and a drive pulley coupled to the output shaft so as to rotate with the output shaft. The clutch assembly includes: a clutch housing; a first shaft rotatably mounted in the housing and including an inner bore; a second shaft positioned in the bore and including an annular shoulder and a distal end portion adapted to engage the roll applicator such that rotation of the second shaft effects rotation of the roll applicator; a spring positioned in the bore and engaging the annular shoulder of the second shaft; a spring retainer secured to the first shaft so as to rotate with the first shaft and engaging and retaining the spring in the bore; and a belt positioned about the drive pulley and a portion of the first shaft such that rotation of the drive pulley effects rotation of the first shaft. The spring effects rotation of the second shaft upon rotation of the first shaft. The portion of the first shaft may comprise a drive pulley mounted to the first shaft.

The distal end portion of the second shaft preferably includes a pin which extends generally transversely to a central axis of the second shaft. The pin is adapted to engage a pin-receiving notch provided in the roll applicator.

In accordance with a second aspect of the present invention, a sizing applicator is provided for applying a coating of sizing composition to glass fibers. The applicator comprises a housing and a roll applicator which is rotatably coupled to the housing. The housing has a supply port adapted to receive sizing composition from a sizing supply source, an exit slot and a passageway extending from the supply port to the exit slot. The passageway receives sizing composition from the supply port and delivers the sizing composition to the exit slot such that the sizing composition exits the housing and is received on an outer surface of the roll applicator. The roll applicator is spaced from the housing such that the housing does not substantially alter sizing composition thickness of the sizing composition received on the roll applicator.

In accordance with a third aspect of the present invention, a sizing applicator is provided for applying a coating of sizing composition to glass fibers. The sizing applicator includes a housing and a roll applicator which is rotatably coupled to the housing. The housing has a supply port adapted to receive sizing composition from a sizing supply source, an exit slot and a passageway extending from the supply port to the exit slot. The passageway receives sizing composition from the supply port and delivers the sizing composition to the exit slot such that the sizing composition exits the housing and is received on an outer surface of the roll applicator. The roll applicator is spaced from the housing such that the housing does not substantially contact the sizing composition once it is received on the roll applicator.

Accordingly, it is an object of the present invention to provide an improved sizing applicator for applying a generally uniform coating of sizing composition to glass fibers. It is further an object of the present invention to provide an improved apparatus for producing sized glass fibers.

BRIEF DESCRIPTION OF DRAWINGS

FIG. 6 is a side view, partially in cross section and partially exploded, showing a roll applicator, a portion of a housing and a portion of a clutch assembly of a sizing applicator of the present invention.

DETAILED DESCRIPTION AND PREFERRED EMBODIMENTS OF THE INVENTION

Figure 1:
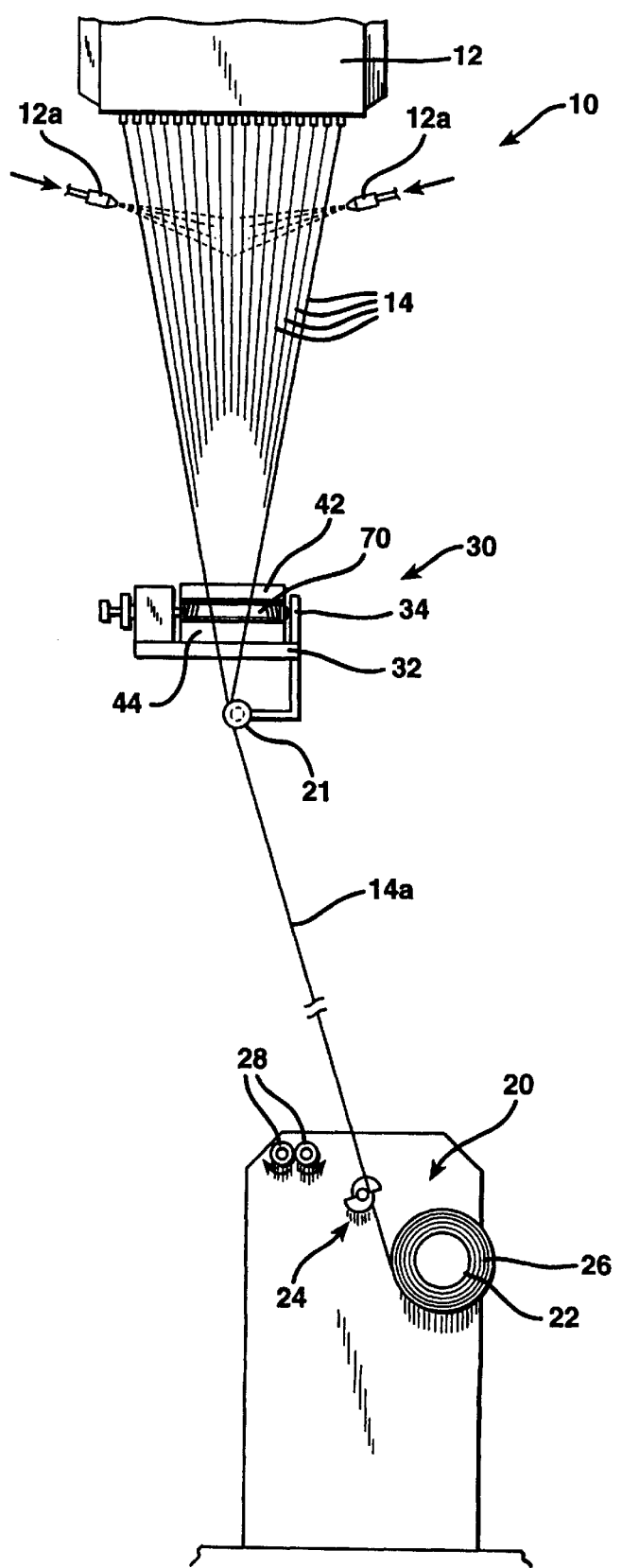
FIG. 1 is a view of an apparatus constructed in accordance with the present invention for producing sized glass fibers.

An apparatus for producing sized glass fibers in accordance with the present invention is shown in FIG. 1, and is generally designated by the reference numeral 10. The apparatus 10 comprises a bushing 12 having a number of orifices (not shown) through which a plurality of streams of molten glass are discharged. The orifices may be extended by hollow studs or tips (not shown). The streams of glass are mechanically drawn to form continuous fibers 14 via a winder device 20. Spray nozzles 12a may be provided to spray water on the newly formed fibers 14 to cool and lubricate the fibers 14. The fibers 14 pass across a sizing applicator 30 which applies a substantially uniform coating of sizing composition (also referred to herein as size) to the fibers 14. Preferably, the sizing composition has a viscosity of about 10 to about 2000 centipoise, more preferably, has a viscosity of about 50 to about 1000 centipoise, and most preferably, has a viscosity of about 100 to about 250 centipoise. The sizing compositions applied by the applicator 30 are typically nonaqueous based, but may be aqueous based. The fibers 14 are gathered into a strand 14a by drawing them over a gathering shoe 21 after sizing composition has been applied to the fibers 14 by the sizing applicator 30.

The winder device 20 comprises a rotatable collet 22 and strand traversing mechanism 24 for distributing the strand 14a lengthwise along the collet 22 during formation of a strand package 26. When the strand 14a is not being collected on the rotating collet 22, the strand 14a can be placed between scrap rolls 28 for attenuation of the strand material. A conventional chopper (not shown) may be used in place of the winder device 20.

Referring now to FIGS. 2–6, the sizing applicator 30 comprises a base plate 32 upon which a side plate 34, a housing 40, a motor assembly 50, and a clutch assembly 60 are mounted. Rotatably mounted between the housing 40 and the clutch assembly 60 is a roll applicator 70. The roll applicator 70 receives sizing composition exiting the housing 40, preferably at a point along an arc A-B on the roller applicator 70, and most preferably, at about point C along arc A-B, see FIG. 5. As is apparent from FIG. 5, the arc A-B is generally positioned above a horizontal plane P, which passes through a central axis $X_0$ of the roll applicator 70. The roll applicator 70 applies a generally uniform coating of sizing composition to the fibers 14 as the fibers 14 pass across the roll applicator 70.

The housing 40 includes upper and lower sections 42 and 44 which may be formed from a metallic material such as Inconel® steel, which is commercially available from Inco Alloys International. In the illustrated embodiment, the upper housing section 42 is provided with two supply ports 46a and 46b which are adapted to receive a liquid sizing composition from a sizing supply source pump 80. The pump 80 receives the sizing composition from a conventional heated holding container or pot 82. Heated hoses 84 are interposed between the housing 40, the holding container 82 and the sizing supply source pump 80 for providing a heated path for the sizing composition to take as it travels from the holding container 82 to the housing 40. The heated hoses 84 are connected to the ports 46a and 46b via conventional fittings 86. Preferably, the supply source pump 80 is capable of supplying the size under pressure at a very precise and constant flow rate. In the illustrated embodiment, the sizing supply source pump 80 comprises a conventional pump which is commercially available from Zenith Pumps Division of Parker Hannifin Corp., under the product designation Zenith Precision Metering Gear Pumps.

Figure 2:
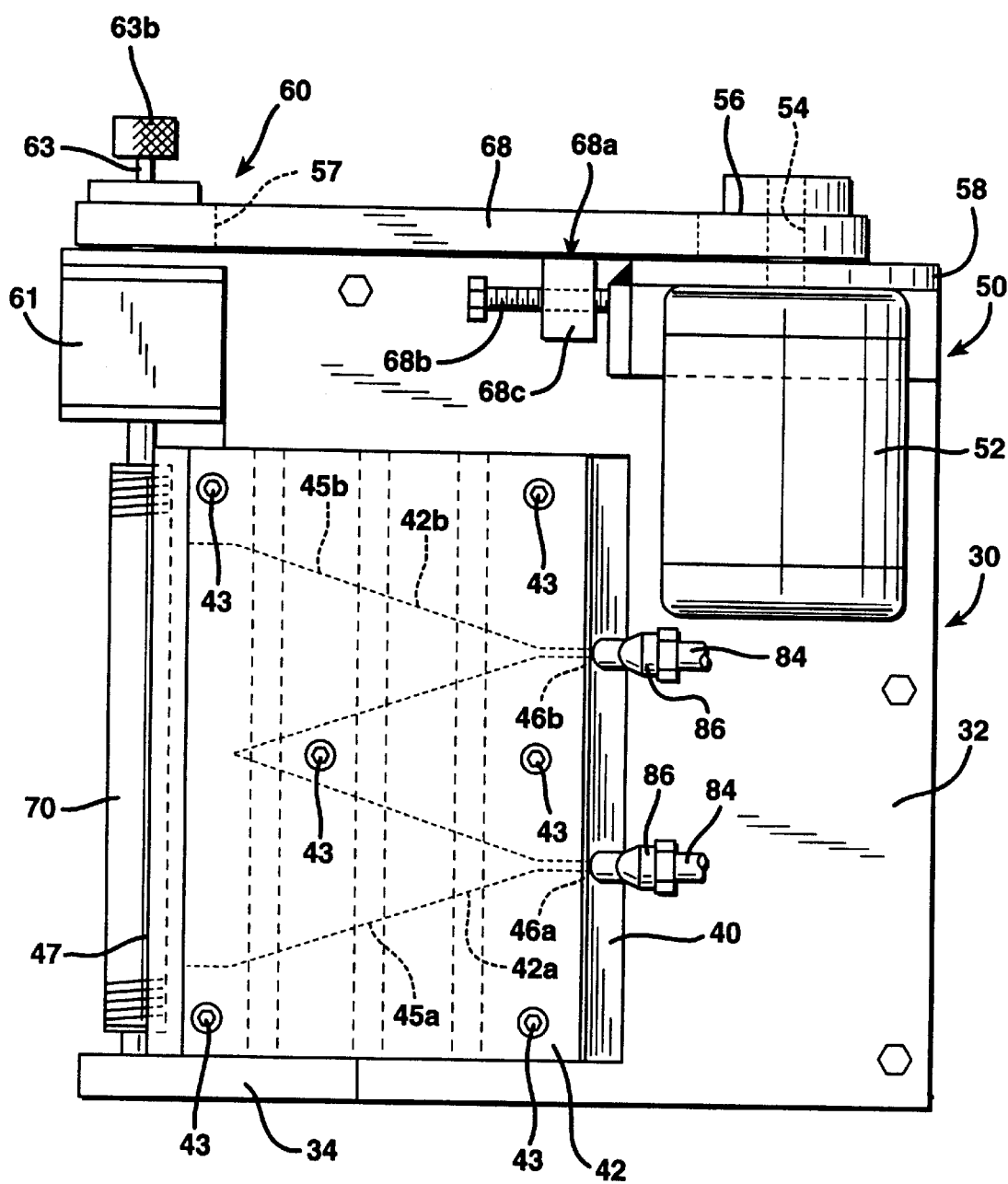
FIG. 2 is a top view of a sizing applicator constructed in accordance with the present invention.
Figure 3:
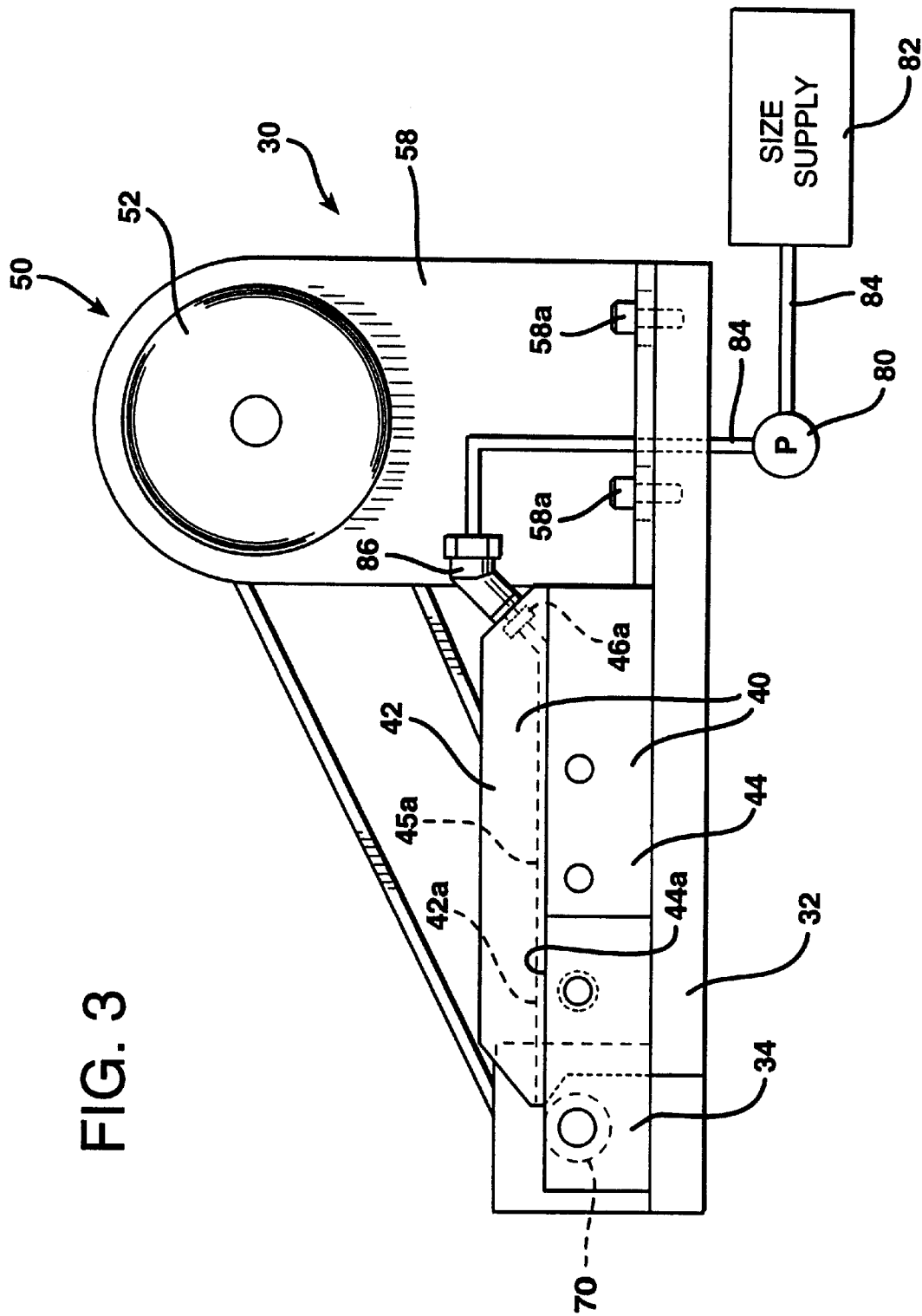
FIG. 3 is a side view of the sizing applicator illustrated in FIG. 2.

The upper housing section 42 has first and second milled sections 42a and 42b, see FIG. 2. When the upper and lower housing sections 42 and 44 are joined together via conventional bolts 43, the milled sections 42a and 42b together with an upper planar surface 44a of the lower housing section 44 define first and second passageways 45a and 45b for receiving sizing composition from the supply ports 46a and 46b. The passageways 45a and 45b extend from the supply ports 46a and 46b, merge together at a point downstream from the supply ports 46a and 46b and terminate at a single exit slot 47, see FIG. 2. Thus, the passageways 45a and 45b receive the sizing composition from the supply ports 46a and 46b and deliver the sizing composition to the exit slot 47.

In the illustrated embodiment, each passageway 45a and 45b has a cross-sectional area which is generally constant from its supply port 46a, 46b to the exit slot 47. The passageways 45a and 45b initially have a generally circular cross section near the supply ports 46a and 46b. However, as they near the exit slot 47, the passageways 45a and 45b become substantially rectangular in cross section. Hence, sizing composition enters each of the passageways 45a and 45b as a generally round stream and is transformed to a relatively thin, substantially rectangular stream by the time it reaches the exit slot 47. By forming the passageways 45a and 45b such that they have a constant cross section along their lengths, the passageways 45a and 45b are continually flushed with new sizing composition and, hence, are self-cleaning. In other words, maintaining a constant cross section throughout the length of each of the passageways 45a and 45b keeps the sizing composition continually moving through the passageways 45a and 45b, thereby substantially reducing or eliminating the possibility that sizing composition may cure or solidify within the passageways 45a and 45b and create a blockage therein.

The lower housing section 44 includes a plurality of heating cartridges 41 for maintaining the housing 40 at an elevated temperature such that the sizing is at a desired viscosity, e.g., at a viscosity of about 10 to about 2000 centipoise as noted above.

The roll applicator 70 includes an outer surface 72 and first and second end portions 74 and 76, see FIG. 6. In the illustrated embodiment, the first end portion 74 has first spirals or threads 74a and the second end portion 76 has second spirals or threads 76a. The first and second spirals 74a and 76a are of opposite hands so as to divert sizing composition which contacts the first and second end portions 74 and 76 inwardly toward a central section of the roll outer surface 72 as the roll applicator 70 rotates.

Preferably, the roll applicator 70 is made from graphite. More preferably, the grade of graphite is U8905 which is commercially available from Schunk & Ebb, Co., located at Menomonee Falls, Wis.

Figure 5:
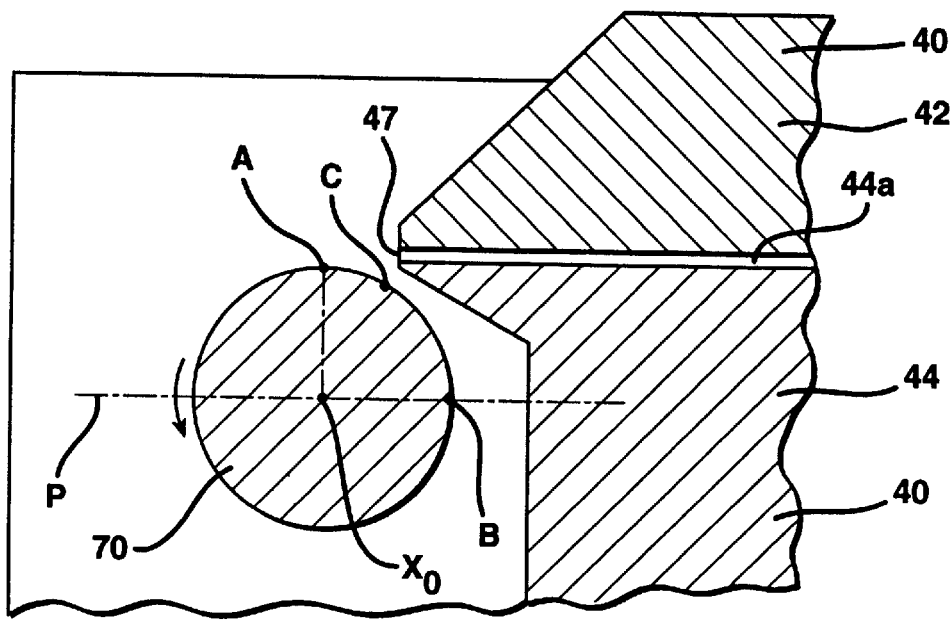
FIG. 5 is an enlarged view of a roll applicator and a housing of a sizing applicator constructed in accordance with a first embodiment of the present invention.
Figure 7:
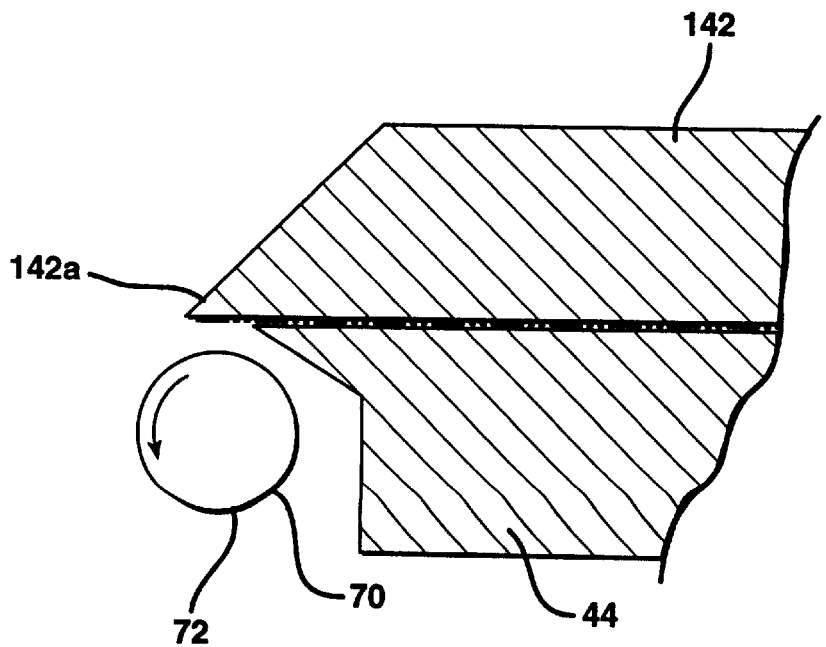
FIG. 7 is a side view, partially in cross section, of a portion of a sizing applicator constructed in accordance with a second embodiment of the present invention.

In the embodiment illustrated in FIG. 5, the upper and lower housing sections 42 and 44 are spaced a sufficient distance from the roll applicator 70 such that they do not substantially contact the sizing applied to the roll applicator 70. Thus, the housing 40 does not substantially alter the thickness of the sizing composition applied to the roll applicator 70. In the embodiment illustrated in FIG. 7, the upper housing section 142 is provided with an extending portion 142a which acts as a glass bead deflector. However, the extending portion 142a is spaced a sufficient distance from the roll applicator 70 such that it does not substantially contact the sizing composition applied to the outer surface 72 of the roll. Nor does the lower section 44 make contact with sizing applied to the roll applicator 70. Since the housing 40 in each of the FIGS. 5 and 7 embodiments does not contact or only nominally contacts the sizing composition applied to the applicator roll 70, the layer of sizing composition along the roll surface 72 will remain relatively constant even if the outer surface 72 of the roll applicator 70 is not completely uniform or if the roll applicator 70 rotates in a nonconcentric manner.

As is noted above, a motor assembly 50 and a clutch assembly 60 (a slip clutch assembly in the illustrated embodiment), which together define a drive apparatus, are mounted on the base plate 32. The motor assembly 50 includes a conventional electric motor 52 having an output shaft 54 and a first drive pulley 56 coupled to the output shaft 54 so as to rotate with the output shaft 54. The motor 52 is mounted on a motor bracket 58 which, in turn, is secured to the plate 32 via bolts 58a.

Figure 4:
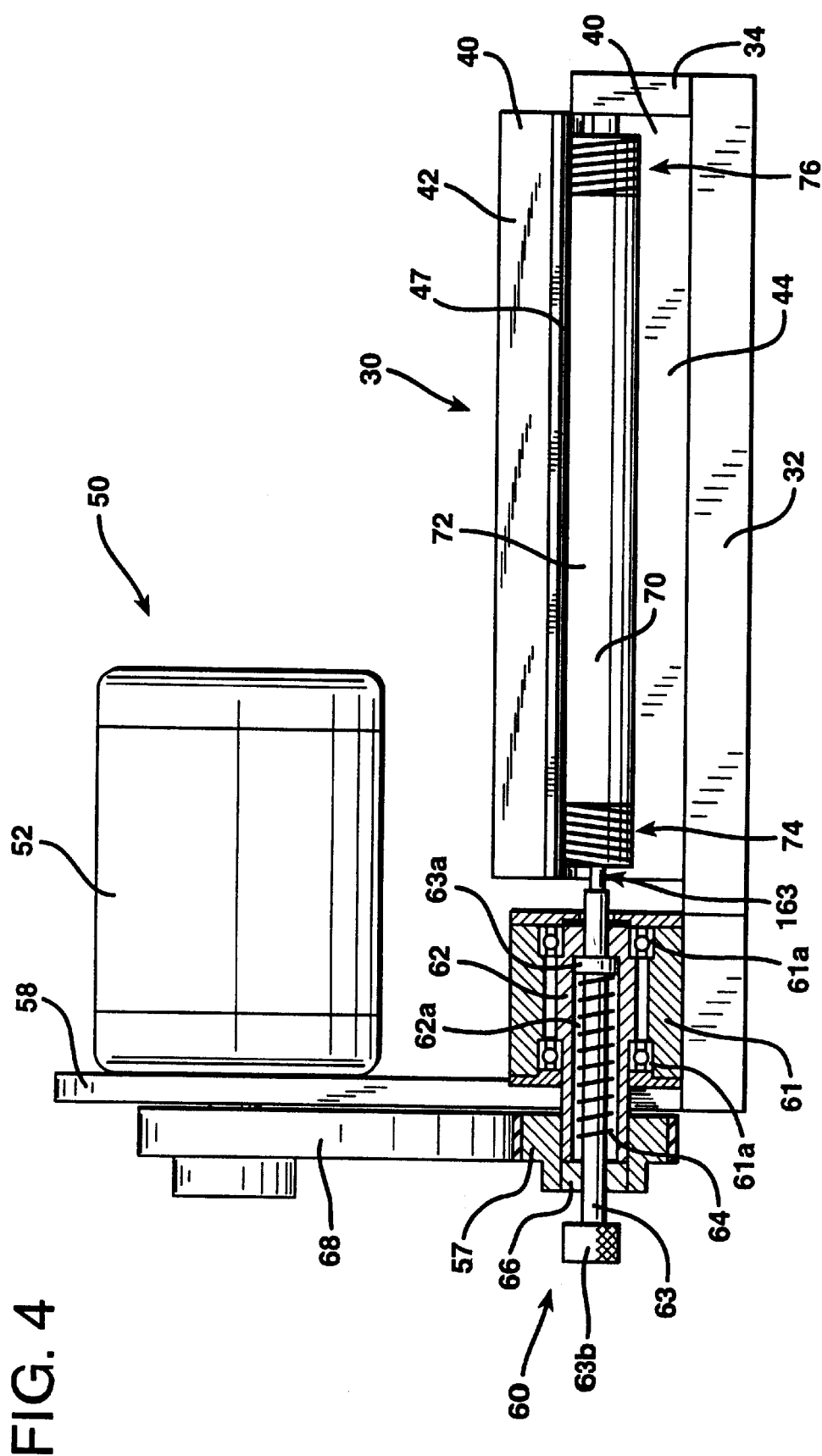
FIG. 4 is a front view, partially in cross section, of the sizing applicator illustrated in FIG. 2.

Referring now to FIG. 4, the clutch assembly 60 includes a clutch housing 61 and a first shaft 62 rotatably mounted via bearings 61a in the housing 61. The first shaft 62 includes an inner bore 62a. A second shaft 63 is positioned in the bore 62a and includes an annular shoulder 63a, a pull knob 63b and a distal end portion 163 adapted to engage the roll applicator 70 such that rotation of the second shaft 63 effects rotation of the roll applicator 70, see also FIG. 6. A compression spring 64 is positioned in the bore 62a about the second shaft 63 and engages the annular shoulder 63a of the second shaft 63. A spring retainer 66 is threadedly secured to the first shaft 62 so as to rotate with the first shaft 62 and engages and retains the spring 64 in the bore 62a. A second drive pulley 57 is secured to the first shaft 62 so as to rotate with the first shaft 62. A belt 68 is positioned about the first and second drive pulleys 56 and 57 such that rotation of the first drive pulley 56 effects rotation of the first shaft 62. Rotation of the first shaft 62 effects rotation of the spring 64 via contact of the spring retainer 66 with the spring 64. The rotating spring 64, in turn, effects rotation of the second shaft 63 via contact of the spring 64 with the annular shoulder 63a of the second shaft 63 and, hence, rotation of the roll applicator 70. One or more washers may be positioned between the spring 64 and the spring retainer 66 and one or more washers may be positioned between the spring 64 and the annular shoulder 63a. It is noted that the speed of the roll applicator 70 is normally varied to compensate for the amount of sizing composition it receives from the housing 40 and which it will then coat onto the fibers 14.

The distal end portion 163 of the second shaft 63 includes a first pin 163a which extends generally transversely to a central axis CA of the second shaft 63, see FIG. 6. The pin 163a is adapted to releasably engage a pin-receiving notch 71 provided in the roll applicator 70.

The roll applicator 70 is provided with first and second inserts (only first insert 78 is shown in FIG. 6), formed from brass in the illustrated embodiment, each having a pin receiving bore (only bore 78a in the first insert 78 is shown in FIG. 6). A second pin 163b, forming part of the distal end portion 163 of the second shaft 63, is received in the bore 78a in the first insert 78. A third pin of a pin assembly 90, which is rotatably mounted in the side plate 34, is received in a bore (not shown) in the second roll applicator insert.

The roll applicator 70 can be easily mounted to and removed from the housing 40 and the clutch assembly 60. To remove the roll applicator 70, an operator need only to grasp the knob 63b and move it away from the housing 61 such that the first and second pins 163a and 163b are removed from the notch 71 and the bore 78a, respectively. The roll applicator 70 is then manually removed from the third pin of the pin assembly 90.

To mount the roll applicator 70 between the housing 40 and the clutch assembly 60, an operator need only to grasp the knob 63b and move it away from the housing 61 such that the end portion 163 is moved toward the housing 61 a sufficient distance to allow the roll applicator 70 to be inserted between the second and third pins. The operator then releases the knob 63b such that the first, second and third pins 163a, 163b become engaged in the notch 71 and the bores in the first and second roll applicator inserts.

A belt tensioner assembly 68a is also mounted to the plate 32. It includes a bolt 68b threadedly engaged with a bracket 68c. As the bolt 68b is threaded into the bracket 68c, it engages the motor bracket 58 and moves it away from the second drive pulley 57 so as to apply additional tension to the belt 68.

Having described the invention in detail and by reference to preferred embodiments thereof, it will be apparent that modifications and variations are possible without departing from the scope of the invention defined in the appended claims.

What is claimed is:

1. An apparatus for producing sized glass fibers comprising:

a heated bushing for supplying streams of molten glass to be drawn into continuous fibers;

a gathering shoe spaced from said bushing;

a device spaced from said bushing and adapted to draw said streams into said fibers; and a sizing applicator located between said bushing and said gathering shoe and including a housing and a roll applicator which is rotatably coupled to said housing, said housing having a supply port adapted to receive sizing composition under pressure from a sizing supply source, an exit slot and a passageway extending from said supply port to said exit slot, said passageway receiving sizing composition from said supply port and delivering said sizing composition to said exit slot such that said sizing composition exits said housing and is received on an outer surface of said roll applicator, said roll applicator being spaced from said housing such that said housing does not substantially contact and alter sizing composition thickness of said sizing composition received on said roll applicator.

2. An apparatus as set forth in claim 1, wherein said device comprises a winder.

3. An apparatus as set forth in claim 1, wherein said roll applicator rotates about a central axis which lies in a generally horizontal plane, said exit slot being positioned above said horizontal plane such that said sizing composition exits said housing and is received on said outer surface of said roll applicator above said horizontal plane.

4. An apparatus as set forth in claim 1, wherein said roll applicator further includes first and second end portions, said first end portion having first spirals and said second end portion having second spirals, said first and second spirals being of opposite hands so as to divert sizing composition which contacts said first and second end portions inwardly as said roll applicator rotates.

5. An apparatus as set forth in claim 1, wherein said passageway has a cross sectional area which is generally constant from said supply port to said exit slot.

6. An apparatus as set forth in claim 1, further including drive apparatus for effecting rotation of said roll applicator, said drive apparatus comprising:
a motor assembly including a motor having an output shaft and a drive pulley coupled to said output shaft so as to rotate with said output shaft;
a clutch assembly including a clutch housing, a first shaft rotatably mounted in said housing and including an inner bore, a second shaft positioned in said bore and including an annular shoulder and a distal end portion adapted to engage said roll applicator such that rotation of said second shaft effects rotation of said roll applicator, a spring positioned in said bore and engaging said annular shoulder of said second shaft, a spring retainer threadedly secured to said first shaft so as to rotate with said first shaft and engaging and retaining said spring in said bore, said spring effecting rotation of said second shaft upon rotation of said first shaft; and
a belt positioned about said drive pulley and a portion of said first shaft such that rotation of said drive pulley effects rotation of said first shaft.

7. An apparatus as set forth in claim 6, wherein said distal end portion of said second shaft includes a pin which extends generally transversely to a central axis of said second shaft, said pin being adapted to engage a pin-receiving notch provided in said roll applicator.

8. A sizing applicator for applying a coating of sizing composition to glass fibers comprising:
a housing and a roll applicator which is rotatably coupled to said housing, said roll applicator having a width and a diameter, wherein said width is greater than said diameter so that said roll applicator is capable of contacting spaced-apart fibers of a fan of said fibers, said housing having a supply port adapted to receive sizing composition from a sizing supply source, an exit slot and a passageway extending from said supply port to said exit slot, said passageway receiving sizing composition from said supply port and delivering said sizing composition to said exit slot such that said sizing composition exits said housing and is received on an outer surface of said roll applicator, said roll applicator being spaced from said housing such that said housing does not substantially alter sizing composition thickness of said sizing composition received on said roll applicator.

9. An apparatus as set forth in claim 8, wherein said roll applicator rotates about a central axis which lies in a generally horizontal plane, said exit slot being positioned above said horizontal plane such that said sizing composition exits said housing and is received on said outer surface of said roll applicator above said horizontal plane.

10. An apparatus as set forth in claim 8, wherein said roll applicator further includes first and second end portions, said first end portion having first spirals and said second end portion having second spirals, said first and second spirals being of opposite hands so as to divert sizing composition which contacts said first and second end portions inwardly as said roll applicator rotates.

11. An apparatus as set forth in claim 8, wherein said passageway has a cross sectional area which is generally constant from said supply port to said exit slot.

12. An apparatus as set forth in claim 8, further including drive apparatus for effecting rotation of said roll applicator, said drive apparatus comprising:
a motor assembly including a motor having an output shaft and a drive pulley coupled to said output shaft so as to rotate with said output shaft;
a clutch assembly including a clutch housing, a first shaft rotatably mounted in said housing and including an inner bore, a second shaft positioned in said bore and including an annular shoulder and a distal end portion adapted to engage said roll applicator such that rotation of said second shaft effects rotation of said roll applicator, a spring positioned in said bore and engaging said annular shoulder of said second shaft, a spring retainer releasably secured to said first shaft so as to rotate with said first shaft and engaging and retaining said spring in said bore, said spring effecting rotation of said second shaft upon rotation of said first shaft; and
a belt positioned about said drive pulley and a portion of said first shaft such that rotation of said drive pulley effects rotation of said first shaft.

13. An apparatus as set forth in claim 12, wherein said distal end portion of said second shaft includes a pin which extends generally transversely to a central axis of said second shaft, said pin being adapted to engage a pin-receiving notch provided in said roll applicator.

14. A sizing applicator for applying a coating of sizing composition to glass fibers comprising:
a housing and a roll applicator which is rotatably coupled to said housing, said housing having a supply port adapted to receive sizing composition from a sizing supply source, an exit slot and a passageway extending from said supply port to said exit slot, said passageway receiving sizing composition from said supply port and delivering said sizing composition to said exit slot such that said sizing composition exits said housing and is received on an outer surface of said roll applicator, said roll applicator being spaced from said housing such that said housing does not substantially contact said sizing composition once it is received on said roll applicator, wherein said roll applicator further includes first and second end portions, said first end portion having first spirals and said second end portion having second spirals, said first and second spirals being of opposite hands so as to divert sizing composition which contacts said first and second end portions inwardly as said roll applicator rotates.

15. An apparatus as set forth in claim 14, wherein said roll applicator rotates about a central axis which lies in a generally horizontal plane, said exit slot being positioned above said horizontal plane such that said sizing composition exits said housing and is received on said outer surface of said roll applicator above said horizontal plane.

16. An apparatus as set forth in claim 14, wherein said passageway has a cross sectional area which is generally constant from said supply port to said exit slot.

17. An apparatus as set forth in claim 14, further including drive apparatus for effecting rotation of said roll applicator, said drive apparatus comprising:

a motor assembly including a motor having an output shaft and a drive pulley coupled to said output shaft so as to rotate with said output shaft;

a clutch assembly including a clutch housing, a first shaft rotatably mounted in said housing and including an inner bore, a second shaft positioned in said bore and including an annular shoulder and a distal end portion adapted to engage said roll applicator such that rotation of said second shaft effects rotation of said roll applicator, a spring positioned in said bore and engaging said annular shoulder of said second shaft, a spring retainer releasably secured to said first shaft so as to rotate with said first shaft and engaging and retaining said spring in said bore, said spring effecting rotation of said second shaft upon rotation of said first shaft; and a belt positioned about said drive pulley and a portion of said first shaft such that rotation of said drive pulley effects rotation of said first shaft.

18. An apparatus as set forth in claim 17, wherein said distal end portion of said second shaft includes a pin which extends generally transversely to a central axis of said second shaft, said pin being adapted to engage a pin-receiving notch provided in said roll applicator.

* * * * *